March 15, 1955  S. G. TILDEN, JR  2,704,267
AUTOMOTIVE FRICTION MATERIAL FACINGS
Filed June 4, 1951
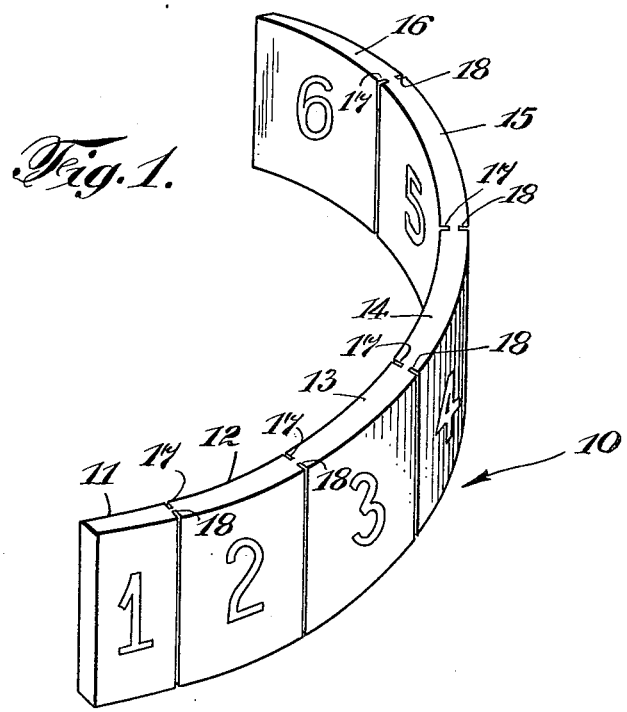
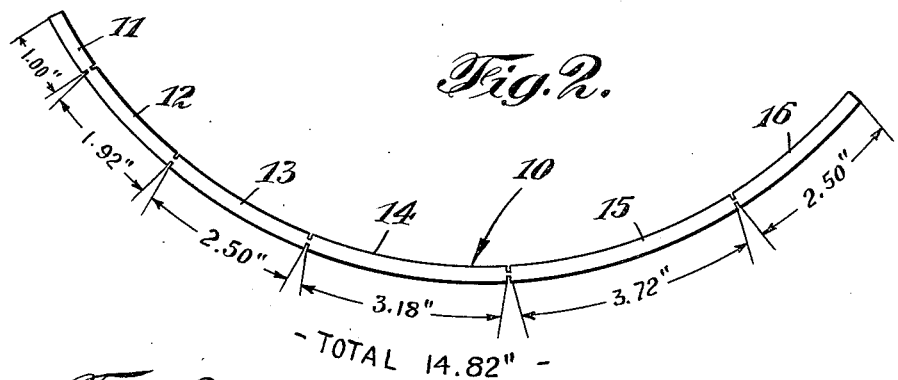
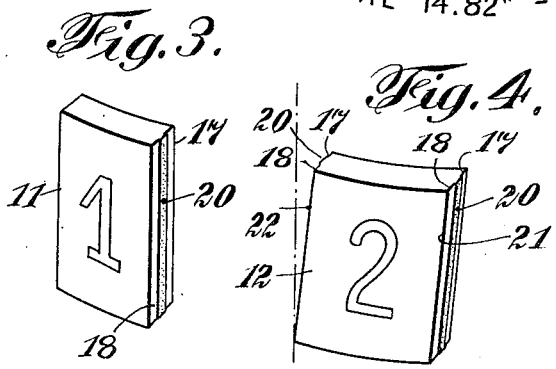
INVENTOR.
Sydney G. Tilden, Jr.
BY C. P. Goepel
his ATTORNEY ns
2,704,267

AUTOMOTIVE FRICTION MATERIAL FACINGS

Sydney G. Tilden, Jr., Levittown, N. Y., assignor to The Permafuse Corp., Garden City, N. Y., a corporation of New York Application June 4, 1951, Serial No. 229,842

1 Claim. (Cl. 154—52)

This invention relates to automotive friction material facings, more particularly to friction material facings of the type applied to the brake shoes of internal expanding automotive brakes by adhesive means of attachment, such facings comprising a plurality of short individual segmental elements bonded to the exterior arcuate surface of each brake shoe, the surface of each brake shoe thus having areas faced with friction material and alternate areas with no friction material facing.

The use of a plurality of short individual or separate segmental elements has definite advantages over a single friction material element for each shoe. Although the total area of brake lining is reduced by this method, the overall efficiency of the brake mechanism is increased by permitting a greater amount of radiation of heat and therefore a higher heat transfer from the friction material to the surrounding air. However, handling a number of short individual segments, particularly when applying the adhesive material coating to the back of each small piece is costly and time consuming, serving to increase the cost of manufacture of the completed brake shoe assembly.

When a plurality of individual segments are employed the arcuate length of each piece is extremely critical, particularly as regards to corresponding segments on the brake shoes of opposite wheels. A segment on one front wheel brake shoe shorter than its complementary segment on the other front wheel brake shoe, would result in a difference in the braking action of the two wheels and would induce dangerous unbalanced lateral forces during the braking application.

The problem of cutting a single long element into a plurality of short individual segments, each of a correct length, is further complicated by the arcuate form of the element. The mechanic attempting to do so will seldom have the tools to accurately measure correct lengths on the curved face of a single friction material element and then cut the individual pieces to this correct length.

Further as each short individual segment must be handled singly in applying the adhesive to the back of the segment preparatory to its attachment to the brake shoe, considerable time is required by the necessitated handling of the many individual pieces. Furthermore, the short individual segments are of various lengths and are likely to be misplaced or shuffled so that they are no longer in proper sequence for easy application to the brake shoe. It is important that each individual segment be placed on the brake shoe in its proper arcuate position and in proper sequence, yet this must be done rapidly and accurately in order to produce a faced shoe assembly at a price which is competitive with a shoe of the prior art which utilized but a single facing running the entire length of the shoe.

The improvement consists in a new and novel strip of friction material facing whereby all of the short individual segments to be used on a pair of brake shoes are supplied in a single continuous arcuate strip and remain connected together in their proper sequence until actually used. When about to be applied to a brake shoe, each individual element is readily segmented by fracture or shear and positioned on the brake shoe surface. The improved friction material facing is thus manufactured in a single length which is equal to the sum of the lengths of the plurality of short individual segments employed on the two shoes of a single brake.

The invention will be further described, embodiments shown in the drawings, and the invention will be finally pointed out in the claim.

In the accompanying drawings,

Fig. 1 is a perspective view of the improved friction material facing;

Fig. 2 is a top view of Fig. 1;

Fig. 3 is a perspective view of an individual segment after being separated from the facing shown in Fig. 1, and Fig. 4 is a perspective view of an individual segment having inclined front and rear sides.

Similar characters of reference indicate corresponding parts throughout.

Referring to the drawings, and more particularly to Figs. 1 and 2, a frictional material facing 10, consists of a plurality of segments, 11 to 16, joined together in a manner that each segment may be broken off or separated from the rest, along score lines 17 and 18 each score line is a notch, cut, cut out, or groove. The score line 17 extends from the rear to near the median line of the facing 10, and the score line 18 extends from the front to near the median line of the facing 10. The depth of these scores depends somewhat on the material of the facing, the essential being that the remaining material of the facing must be sufficient to hold the segmental panels together during the use of the facing when breaking off one segment, and yet be not too much to prevent a clean separation of one segment from the other. In Fig. 3 is shown a segment one side having clear surfaces corresponding to the scores 17 and 18, and the central portion showing a relatively clean breakage at 20 due to its narrowness, or the thinness of material ruptured. In Fig. 4 is shown a segment having inclined front and rear sides 21 and 22. In Figs. 3 and 4 are shown the clean flat sides with the narrow cleaved material therebetween.

Referring to Fig. 2, for example, a certain model of the 1951 Buick car employs three individual segments on each primary brake shoe, respectively 1.00", 1.92", and 2.50" long, measured along the exterior arcuate surface and three individual segments on each secondary brake shoe, respectively 3.18", 3.72", and 2.50" long likewise measured along the exterior arcuate surface. The improved friction material facing for this brake is made in one piece of a total arcuate length equal to the sum of these individual segment lengths, or 14.82". This facing is then scored, cut, or otherwise weakened on a line across the faces of the element marking each individual length so that each short segment may be readily broken off by hand, if the particular friction material is readily frangible, or can be cut through with a shear if the material is not frangible, after the inner surface of the facing has had an adhesive applied to all the segmental elements. The scoring or cutting is done so that the individual segments are in sequence and each segment is numbered. The segments are thus in proper order for placement on the brake shoe surfaces and identified as such by the consecutive numbering. As an example, the improved friction material element for the Buick brake shoes mentioned above has a first score 1.00" in from one end and that segmental portion is identified by being marked 1, a second score is made 1.92" from the first score and that segmental portion identified by being marked 2, a third score is made 2.50" from the second score and that portion marked 3, a fourth score is made 3.18" from the third score and that segmental section marked 4, the fifth score is made 3.72" from the fourth score and that segmental portion marked 5, leaving a remaining segmental portion 2.50" long marked 6.

The improved friction material facing can thus be manufactured, shipped, and handled as a single piece of material sufficient for the two shoes of a single brake at a great saving of manufacturing, packaging, and assembly cost. It can also be handled as one piece during the application of the adhesive to the back of the facing before bonding, as against the prior art which necessitated applying the adhesive to each of the six individual segments.

It is sometimes desirable to use friction material made of a certain compounded treatment and having frictional characteristics on the primary brake shoe and another friction material of a different compounded treatment having different characteristics on the secondary shoe. In such case, applicant's improved segment for a single brake would of necessity consist of two elements, one of the compounding treatment desired for use on the primary shoe, having a total length equal to the sum of the lengths of the individual segments employed on the primary shoe and the other of the compounded treatment desired for use on the secondary shoe, having a total length equal to the sum of the lengths of the individual segments employed on the secondary shoe. In the case of 1951 Buick brake referred to above, the segment for the primary shoe would be of a certain selected compound and made 5.42" long (1.00" plus 1.92" plus 2.50") and that for the secondary shoe would be made of another selected compound and made 9.40" long (3.18" plus 3.72" plus 2.50").

In the manufacture of applicant's improved friction material facing, it is possible to closely control the positioning of the scores and the arcuate length of the individual segments under factory supervision and with production standards of accuracy. In the application of the individual segments to the brake shoes, the mechanic, whether under factory supervision or self-employed with his limited facilities, can accurately fracture or shear the single element into individual segments of the proper length.

Another advantage of the improved friction material facing is that it need not be wholly or partly segmental into individual elements to be of use as a friction material facing. It is entirely feasible that the improved facing having a certain total arcuate length while still unsegmented and of a continuous piece, could be used on a brake shoe of the prior art on which a single facing is employed. In such an application, the facing need not be segmented at the scores and the scores will have no inimical effect on the braking action.

In the embodiment shown in Figs. 1 to 3, the improved friction material facing has the scores across the faces of the element made at right angles to its longitudinal line of the edges. The embodiment shown in Fig. 4 has the facing provided with the scores at some oblique angle to improve the wiping action of the leading edge of the segment in scavenging the brake drum surface of abrasive dust which accumulates in service. The scores or cuts can be made at any angle selected to the longitudinal line of the facing and the individual pieces fractured or sheared at this angle at the time they are segmented in the manner before described.

Friction material facings with openings and grooves on either or both sides are old. But the improvement herein described is a combination of aligned grooves entering from both sides of the concavo-convex facing, leaving a narrow strip of facing material therebetween, to be sundered by angularly moving one segment in respect to its contiguous segment forming part of the facing, so that on severance, the side of the fragment has the smooth sides of the grooves with only a narrow strip of sundered friction material therebetween.

I do not wish to be limited to the details of the embodiment described or to the details of the manner of making the same, since changes may occur to one skilled in the art, without departing from the invention as defined by the claims appended hereto.

I claim:

In an automotive friction material facing of arcuate shape, said friction material being concave at its inner face and convex at its outer face, the length of said friction material being greater than its width and its width being greater than its thickness, the combination of a series of segmental panels forming a chain-like strip, the adjacent panels being separated by a pair of smooth scores, one of said scores being in said concave inner face and one in said convex outer face, each score of said pair extending from each face in alignment with its mating score on the opposite face and being somewhat less than one half of said thickness of said friction material facing leaving aligned scores between said series of segmental panels separate from each other by a relatively thin remainder of material of said friction facing to insure frangibility of the intervening material when one of said series of segmental panels is angularly moved with respect to its contiguous panel, each pair of said aligned scores being in a plane with the radius of the arcuate facing and substantially normal to the longitudinal dimension of said arcuate facing, the end surface of each of said segmental panels, upon separation thereof from its contiguous panel, along the line indicated by said pair of intermediate scores, having substantially a smooth surface with a narrow median strip of sundered material of said facing.

References Cited in the file of this patent

UNITED STATES PATENTS

| | | |
|---|---|---|
| 676,799 | McLoughlin | June 18, 1901 |
| 1,184,254 | McBean | May 23, 1916 |
| 1,498,983 | Schmidt | June 24, 1924 |
| 1,738,291 | Gatke | Dec. 3, 1929 |
| 1,768,922 | Oliver | July 1, 1930 |
| 1,790,178 | Sutherland | Jan. 27, 1931 |
| 1,839,699 | Parkhurst | Jan. 5, 1932 |
| 1,890,425 | Whitworth | Dec. 6, 1932 |
| 1,983,464 | Kitchen | Dec. 4, 1934 |
| 2,032,066 | Nieman et al. | Feb. 25, 1936 |
| 2,061,919 | Nanfeldt | Nov. 24, 1936 |
| 2,236,311 | Eksergian | Mar. 25, 1941 |
| 2,438,483 | Tack | Mar. 28, 1948 |

FOREIGN PATENTS

| | | |
|---|---|---|
| 24,539 | Netherlands | Oct. 8, 1929 |